United States Patent [19]

Botos

[11] 3,727,471
[45] Apr. 17, 1973

[54] COARSE AND FINE ADJUSTMENT AND POSITIONING MECHANISMS

[76] Inventor: Stephen J. Botos, 112 Tent Street, Pittsburgh, Pa. 15215

[22] Filed: Sept. 20, 1971

[21] Appl. No.: 181,675

[52] U.S. Cl..............74/89.15, 74/424.8 B, 350/45, 33/163
[51] Int. Cl..............................F16h 27/02
[58] Field of Search................74/89.15; 350/45, 350/46, 47, 48; 33/163, 164, 166, 170; 74/424.8 B

[56] References Cited

UNITED STATES PATENTS 3,605,508   9/1971   Fell......................................74/89.15
3,628,386   12/1971  Blum...................................74/89.15

Primary Examiner—Charles J. Myhre
Assistant Examiner—Wesley S. Ratliff, Jr.
Attorney—T. A. Zalenski

[57] ABSTRACT

A mechanism for effecting both coarse and fine adjustment or positioning of an element includes a fine resolution positioner comprising a longitudinally extending shaft having two threaded sections of different pitch. Threadably received on one of the threaded sections is a coarse range selector which is mounted for free rotative motion on a seat in a support plate. An adjusting member is threadably received on the other threaded section of the fine resolution positioner. Coarse adjustment or positioning is accomplished by turning the coarse range selector, resulting in longitudinal movement of either the selector or the adjusting member along the fine resolution positioner. Fine adjustment or positioning is accomplished by turning the fine resolution positioner which results in its turning in both the coarse range selector and adjusting member to effect displacement of both along the fine resolution positioner. The relative displacement between the two is a function of the difference in the pitches of the two threaded sections of the fine resolution positioner on which they are respectively received.

8 Claims, 2 Drawing Figures

3,727,471

INVENTOR.
STEPHEN J. BOTOS
BY
his ATTORNEY

COARSE AND FINE ADJUSTMENT AND POSITIONING MECHANISMS

BACKGROUND OF THE INVENTION

This invention relates to adjustment and positioning mechanisms by means of which both coarse and fine adjustments can be made and which employ the differential screw principle.

Many devices exist in which a component must be positioned with extreme accuracy and the position adjusted over a rather large range from time to time. Such a device, for example, is an optical mount for supporting a mirror or other optical component.

Differential screw mechanisms are conventionally used for this purpose. The difficulty with prior art differential screw mechanisms, however, is that when a rather large or coarse adjustment is required, it is necessary to make many turns of the screw to bring a component to the new position. It is preferable that the component be brought rapidly to approximately its new position and then a fine adjustment performed to position the component at the desired position with extreme accuracy.

SUMMARY OF THE INVENTION

Accordingly, it is an object of the invention to provide a mechanism for effecting coarse adjustment or positioning of an element rapidly and fine adjustment or positioning with extreme accuracy.

It is another object of the invention to provide such a mechanism employing the differential screw principle for making fine adjustments.

Yet another object of the invention is to provide such a mechanism in a substantially unitary assembly.

Still another object of the invention is to provide such a mechanism which is self-aligning to compensate for angular movements of the elements with which it is used.

Briefly, the invention includes a longitudinally extending shaft having two threaded sections of different pitch. A stepped cylindrical member, referred to as a coarse range selector, has a threaded longitudinally extending bore by means of which it is threadably mounted on one of the threaded sections of the shaft. One of the steps in the stepped cylindrical member has a generally spherical surface which engages a complementary seating surface in a first element, such as a housing wall, base plate or the like, the stepped cylindrical member, thus, being free to rotate and pivot on said seating surface.

In a first embodiment of the invention, a second stepped cylindrical member has a threaded longitudinally extending bore by means of which it is threadably mounted on the other threaded section of the shaft. Its stepped portion also defines a generally spherical surface which engages a complementary seating surface in a second element, such as a support member for an optical mirror, located opposite the first element. The spherical surfaces of the stepped cylindrical member face one another so that a compression spring positioned about the threaded shaft between the spherical surfaces and bearing at its ends against abutment surfaces in the first and second elements takes up clearance in the threads and establishes a positive and stable seating relationship between the stepped cylindrical members and the seating surfaces in the two elements. This seating arrangement also results in the mechanism being completely self-aligning.

To effect a coarse adjustment, the coarse range selector is rotated in its seat, resulting in the relative rotation of the shaft in either the selector or the second stepped cylindrical member, whichever one is received on the finer threaded section of the shaft. Where the selector is mounted on the threaded section of the shaft of coarser pitch, the threaded shaft turns with the selector, resulting in the turning of the shaft in the second stepped cylindrical member which is received on the finer threaded section of the shaft to make the required adjustment. Where the selector is mounted on the threaded section of the shaft of finer pitch, rotation of the selector results in its turning about the shaft to effect the coarse adjustment.

To effect a fine adjustment, the threaded shaft is turned, resulting in the turning of the shaft in both stepped cylindrical members, thus, making use of the differential screw principle to achieve the required fine adjustment.

In a second embodiment of the invention, an actuating wedge is used in place of the second stepped cylindrical member. The wedge has a threaded bore by means of which it is threadably mounted on one of the threaded sections of the shaft. The wedge is located within a recess in the first element and has a planar surface which is inclined to the axis of the threaded shaft. A compression spring positioned about the shaft between the wedge and the spherical surface of the coarse range selector bears at its ends against the wedge and an abutment surface in the first element to establish a stable seating arrangement for the selector.

A ball-like member has a planar surface by means of which it rests on the inclined surface of the wedge. Opposite its planar surface, the ball-like member is provided with a notch in which rests a projection affixed to a second element such as a support member for an optical mirror. A leaf spring positioned over the ball-like member serves to maintain it in place as the wedge moves under it along the threaded shaft. Such movement of the wedge, depending on the direction of movement, raises or lowers the ball-like member effecting displacement of the second element in a direction perpendicular to the axis of the threaded shaft.

As with the first embodiment of the invention, where the coarse range selector is mounted on the coarser threaded section of the shaft, turning of the selector results in the simultaneous turning of the shaft. This turning of the shaft in the wedge causes the wedge to move along the shaft, resulting in raising or lowering of the ball-like member and the coarse adjustment of the second element. Where the selector is mounted on the finer threaded section of the shaft, turning of the selector results in its turning about the shaft to effect coarse adjustment. Also, as with the first embodiment, turning of the shaft results in its turning in both the coarse range selector and the wedge causing the wedge to move the shaft according to the difference in the pitches of the threaded sections of the shaft. This linear movement is then transferred as fine perpendicular movement to the second element.

The objects and advantages of this invention will become apparent from the following detailed description of the two embodiments thereof, with reference to the accompanying drawing.

DETAILED DESCRIPTION OF THE INVENTION

Figure 1:
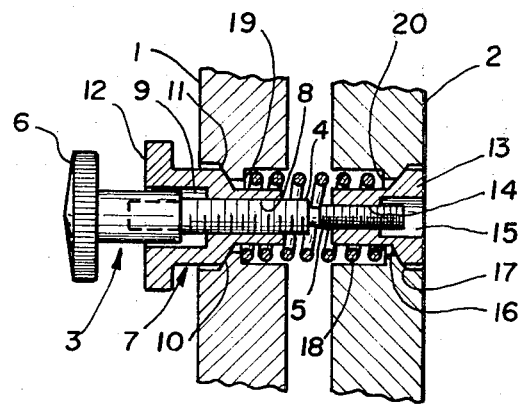
FIG. 1 is a view partly in cross-section, of a first embodiment of the invention.

In the following detailed descriptions of the two embodiments of the invention, the same reference numerals refer to like parts in the embodiments.

Referring to FIG. 1, the first embodiment of the invention is shown mounted in a first element 1 and second element 2 such as the support plate and mounting plate, respectively, of a conventional mirror mount. It includes a fine resolution positioner means, indicated generally at 3, which consists of longitudinally extending cylindrical shaft having two longitudinally spaced threaded sections 4 and 5 and a knurled knob 6 at one end. Threaded section 4 is of a larger size and coarser pitch, e.g., ¼-39 than threaded section 5 which can be a No. 10-40 thread.

A coarse range selector means comprising a stepped cylindrical member, indicated generally at 7, is provided with an internally threaded bore 8 by means of which the coarse range selector is threadably received on threaded section 4 of the fine resolution positioner means 3. Threaded bore 8 extends through the coarse range selector along its axis of rotation and into recess 9 in the selector.

Stepped portion 10 of the selector is provided with a generally spherical surface defining a shoulder which engages a complementary seating surface 11 in component 1 for free rotative motion thereon without displacement of the shoulder from the seating surface. Cylindrical portion 12 of the selector functions as a knob for turning or rotating the selector on its seat 11 and can be knurled.

An adjusting means, indicated generally at 13, and comprising a retaining nut having a stepped cylindrical configuration is provided with an internally threaded bore 14 by means of which it is threadably received on the finer threaded section 5 of positioner means 3. Threaded bore 14 extends through retaining nut 13 along its axis of rotation and into recess 15 in the nut.

Stepped portion 16 of the retaining nut is provided with a generally spherical surface defining a shoulder which engages a complementary seating surface 17 in component 2 for free pivotal motion thereon. The generally spherical surfaces 10 and 16 on selector 7 and retaining nut 13, respectively, thus, face one another.

A compression spring 18 is positioned about positioner 3 between the surfaces 10 and 16. The ends of the spring bear on abutment surfaces 19 and 20 in components 1 and 2, respectively, to urge the two components apart. As a result, any clearance in the threads is taken up and a stable seating arrangement for the selector 7 and nut 13 on seating surfaces 11 and 16, respectively, provided.

In operation, to make a fine adjustment, fine resolution positioner 3 is turned by means of knob 6 either clockwise or counterclockwise depending, as it will be understood, whether a forward or backward adjustment is desired. Because a larger frictional torque exists between spherical surfaces 10 and 16 and their seating surfaces 11 and 17, respectively, than exists between threaded sections 4 and 5 and threaded bores 8 and 14, respectively, turning of positioner 3 causes it to turn in range selector 7 and retaining nut 13, resulting in their displacement along the positioner to effect an adjustment between components 1 and 2. For the thread sizes mentioned above, a one degree turn of the fine resolution positioner results in a relative movement between the coarse range selector and retaining nut of about 0.000002 inch.

To make a coarse adjustment, coarse range selector 7 is turned on its seat 11 by means of knob 12. Because the threaded section 4 has larger threads than threaded section 5 of the positioner, the positioner turns with the coarse range selector. The positioner will thus turn in retaining nut 13 causing it displacement along threaded section 5 to effect a coarse adjustment of component 2 relative to component 1. Where the positioner is constructed so that threaded section 5 is of coarser pitch than threaded section 4, turning of selector 7 causes it to turn about the positioner while nut 13 and the positioner remain fixed relative to one another.

In the application of the invention to a conventional mirror mount, the mirror mount is constructed so that mounting plate 2 tilts relative to the support plate 1 when the adjusting mechanism is operated. The invention accommodates itself to such tilting by means of the spherical seating arrangements provided coarse range selector 7 and adjusting means 13. It will be understood, however, that if this self-aligning feature is not required, such as where strictly linear as opposed to tilting adjustments are needed, the retaining nut 13 can be eliminated and a threaded bore be provided directly in component 2 to threadably receive threaded section 5 of positioner 3. In such instance, the threaded bore in component 2 comprises the adjusting means.

Figure 2:
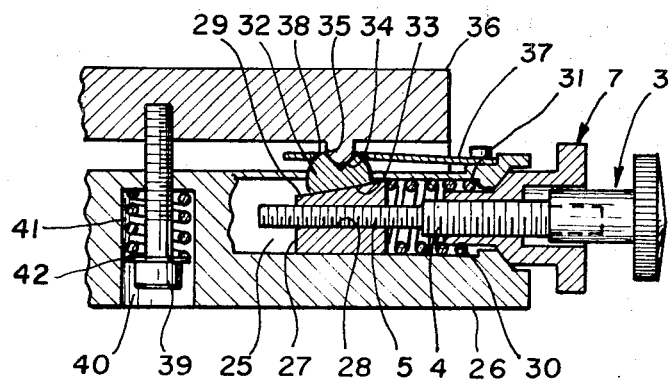
FIG. 2 is a view partly in cross-section, of a second embodiment of the invention.

Referring now to FIG. 2 of the drawing, which illustrates a second embodiment of the invention particularly useful for effecting linear motion perpendicular to the axis of the fine resolution positioner, the mechanism is shown located within a recess 25 of a base plate 26. The fine resolution positioner 3 and coarse range selector 7 have the same construction as in the first embodiment of the invention and a seat for receiving the spherical rotating surface of the selector 7 is provided in base plate 26.

An adjustment means comprising a wedge 27 having a longitudinally threaded bore 28 is threadably received on threaded section 5 of the positioner by means of said bore. The wedge rests on the bottom of recess 25 which is of a configuration to preclude the rotation of the wedge therewithin.

The top of the wedge is provided with a planar surface 29 which is inclined to the axis of positioner 3. A compression spring 30 positioned about positioner 3 between the wedge and the coarse range selector bears at one end on the back of the wedge and at the other end on abutment surface 31 provided in recess 25. The spring takes up any play in the threaded sections 4 and 5 of the positioner and establishes a firm seating arrangement for selector 7 in base plate 26.

A ball-like member 32 rests on inclined surfaces 29 by means of its planar surface 33. The top of member 32 is notched at 34 to receive rounded projection 35 fixed to plate 36. A leaf spring 37 attached to the top of base plate 26 is provided with an opening 38, and is placed down over member 32 such that notch 34 is free to engage projection 35 through opening 38. The leaf spring functions to maintain member 32 in good contact with wedge 27 and prevent member 32 from being displaced horizontally.

A screw member 39 is located within recess 41 of base plate 26 and is threaded into plate 36. A compression spring bearing on the bottom of recess 40 and abutment means 42 functions to urge plates 26 and 36 together.

From the foregoing description of the embodiment of FIG. 2, it will be understood that fine adjustment is effected by turning positioner 3 which results in the turning of the positioner in selector 7 and wedge 27 to cause their displacements along threaded sections 4 and 5, respectively. As wedge 27 moves along threaded section 5, sliding under ball-like member 32, the latter rides up or down, depending on the direction in which positioner 3 is turned, on inclined surface 29. This vertical motion is transmitted to plate 36 through projection 35 to make the required adjustment. Using the thread sizes referred to above, vertical movements of as small as 0.00000003 inch can be made.

In making a coarse adjustment, as with the embodiment of FIG. 1, coarse range selector 7 is turned, causing the simultaneous turning of selector 3 with it and the turning of the selector in wedge 27. The resulting movement of the wedge 27 along threaded section 5 effects a coarse adjustment in plate 36. Again, where threaded section 5 is of coarser pitch than threaded section 4, turning of selector 7 causes it to turn about the positioner while wedge 27 and the positioner remain fixed relative to one another.

It will be understood that while the invention has been described with particular reference to its use with optical mirror mounts, it has application wherever there is a need for a mechanism for making rapid coarse and precise fine adjustments.

I claim:

1. A mechanism for adjusting the position of a first element relative to a second element comprising coarse range selector means having a shoulder for engaging a seat in the first element so as to be free to rotate on said seat about an axis of rotation, without displacement of the shoulder from the seat, the coarse range selector means having a threaded bore coaxial with its axis of rotation, a longitudinally extending positioner means having longitudinally spaced first and second threaded sections of different pitch, the positioner means extending through the coarse range selector means and the threaded bore of the coarse range selector means being received on the first threaded section of the positioner means, adjusting means having an internally threaded bore receiving the second threaded section of the positioner means and cooperating with the second element whereby rotation of the coarse range selector means results in the relative rotation of the positioner means in one of the adjusting means or coarse range selector means and the consequent longitudinal displacement of said one of the adjusting means or coarse range selector means along the positioner means to effect a coarse adjustment in the position of the first element relative to the second element, and rotation of the positioner means results in both the longitudinal displacement of the coarse range selector means along the first threaded section of the positioner means and of the adjusting means along the second threaded section of the positioner means to effect a fine adjustment in the position of the first element relative to the second element.

2. The mechanism of claim 1 wherein said adjusting means has a shoulder which engages a seat in the second element, the seat in the second element facing away from the seat in the first element.

3. The mechanism of claim 2 wherein the shoulders of the range selector means and the adjusting means are substantially spherical and the seats in the first and second elements which engage said shoulders are of a complementary configuration to permit angular movement of the range selector means and the adjusting means on their respective seats.

4. The mechanism of claim 3 including a compression spring positioned about the positioner means between the range selector means and the adjusting means and in abutment at its ends with the first and second elements respectively urging said elements apart so as to maintain good contact between the range selector means shoulder and the seat in the first element and between the shoulder of the adjusting means and the seat in the second element.

5. The mechanism of claim 1, wherein the coarse range selector means is received on the threaded section of the positioner means of coarser pitch.

6. The mechanism of claim 1 wherein said adjusting means includes an actuating wedge having a surface inclined to the longitudinal axis of the positioner means, means in contact with the second element and in sliding engagement with said inclined surface whereby longitudinal displacement of the actuating wedge along the second threaded section of the positioner means results in the displacement of the engaging means in a direction perpendicular to the direction of said longitudinal displacement.

7. The mechanism of claim 6 including a compression spring located in said first element about said positioner means in abutment at its ends with the actuating wedge and abutment means in the first element.

8. The mechanism of claim 6, wherein the coarse range selector means is received on the threaded section of the positioner means of coarser pitch.

* * * * *